March 25, 1930.  A. W. NICHOLSON  1,751,943
ENGINEER'S BRAKE VALVE FOR AIR BRAKE SYSTEMS
Filed Aug. 15, 1928    5 Sheets-Sheet 1
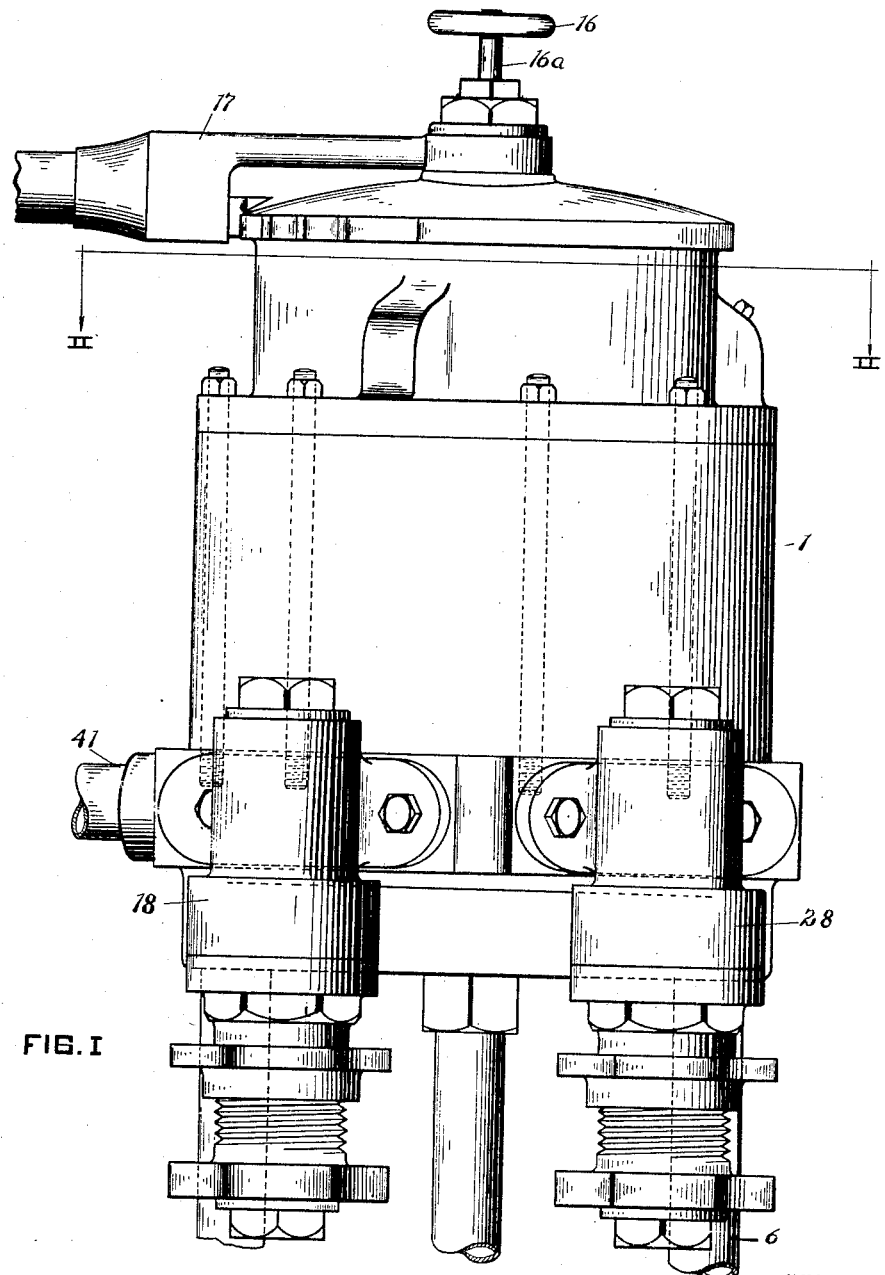
FIG. I
INVENTOR
Alexander W. Nicholson
by William B. Wharton
his attorney

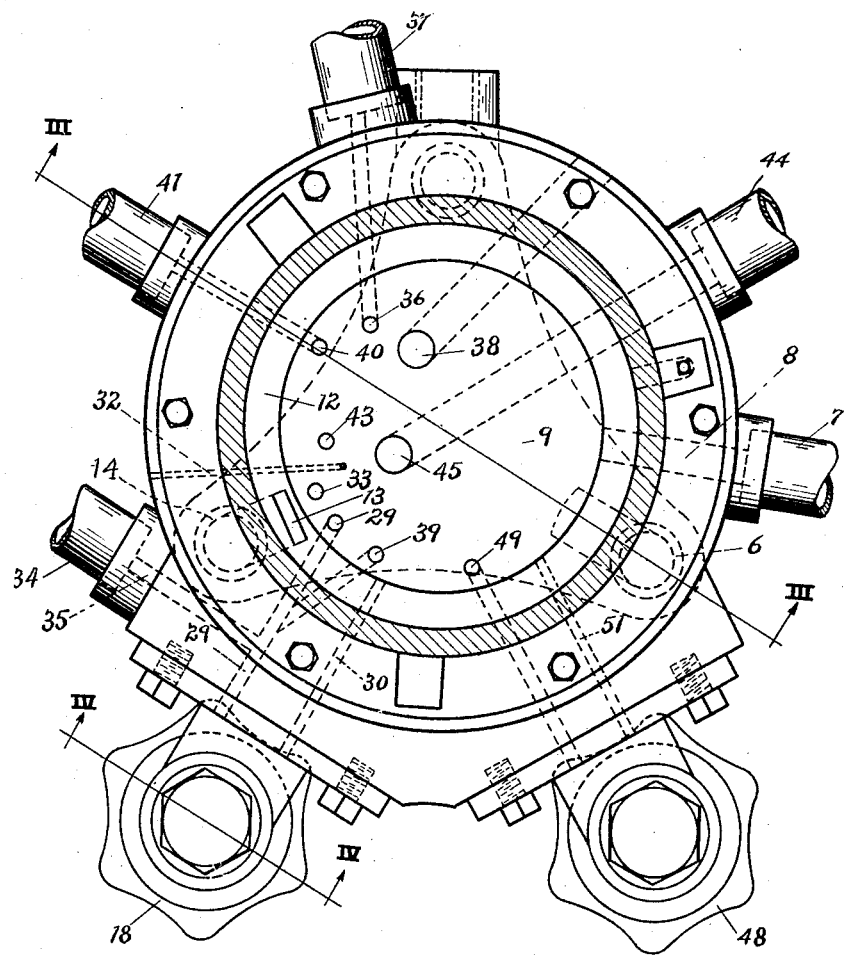
FIG.II

March 25, 1930.  A. W. NICHOLSON  1,751,943
ENGINEER'S BRAKE VALVE FOR AIR BRAKE SYSTEMS
Filed Aug. 15, 1928    5 Sheets-Sheet 3
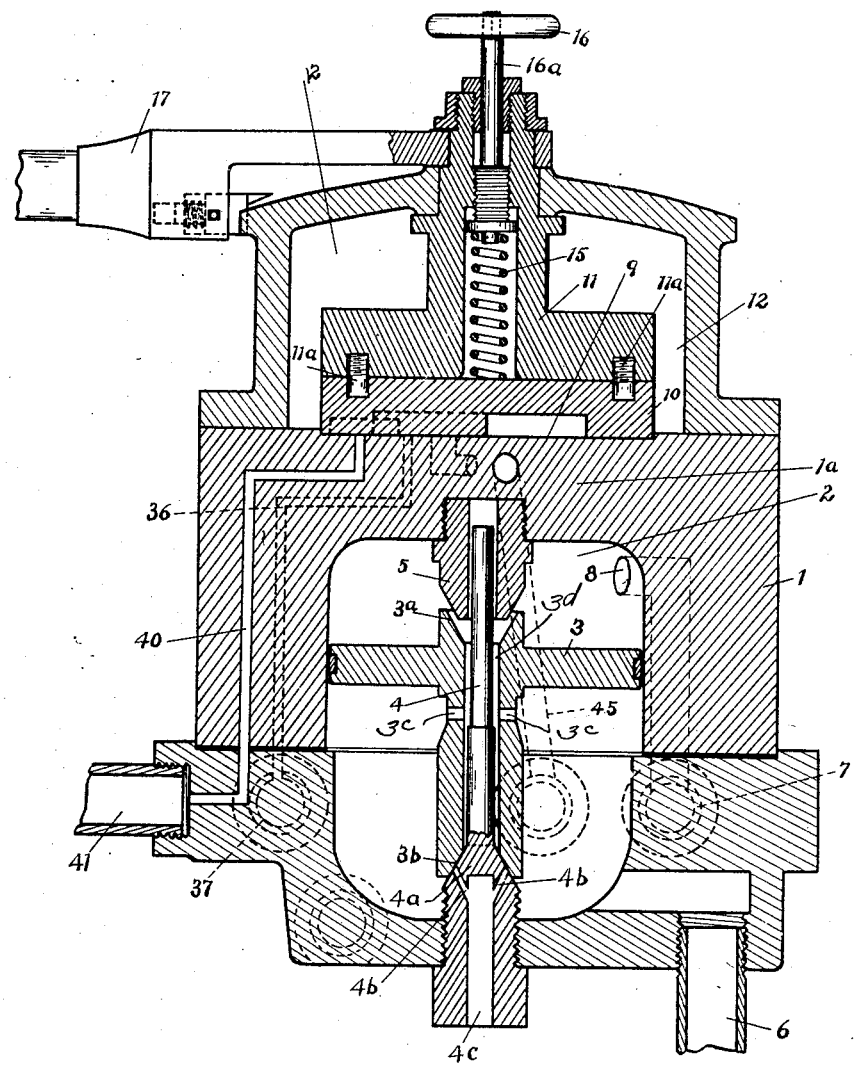
FIG. III
INVENTOR
Alexander W. Nicholson
by William B. Wharton
his attorney March 25, 1930.  A. W. NICHOLSON  1,751,943
ENGINEER'S BRAKE VALVE FOR AIR BRAKE SYSTEMS
Filed Aug. 15, 1928　　5 Sheets-Sheet 4
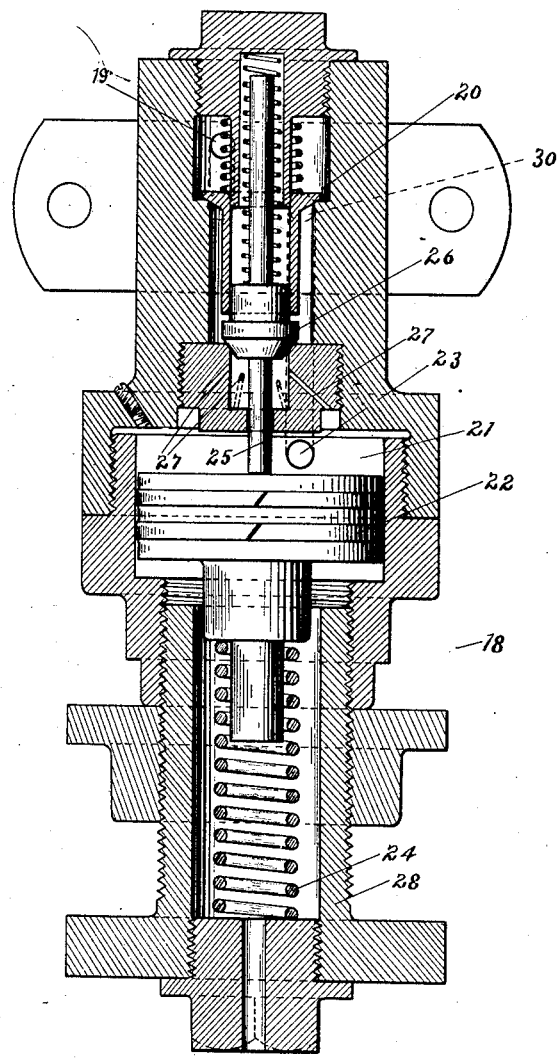
FIG. IV
INVENTOR
Alexander W. Nicholson
by William B. Wharton
his attorney

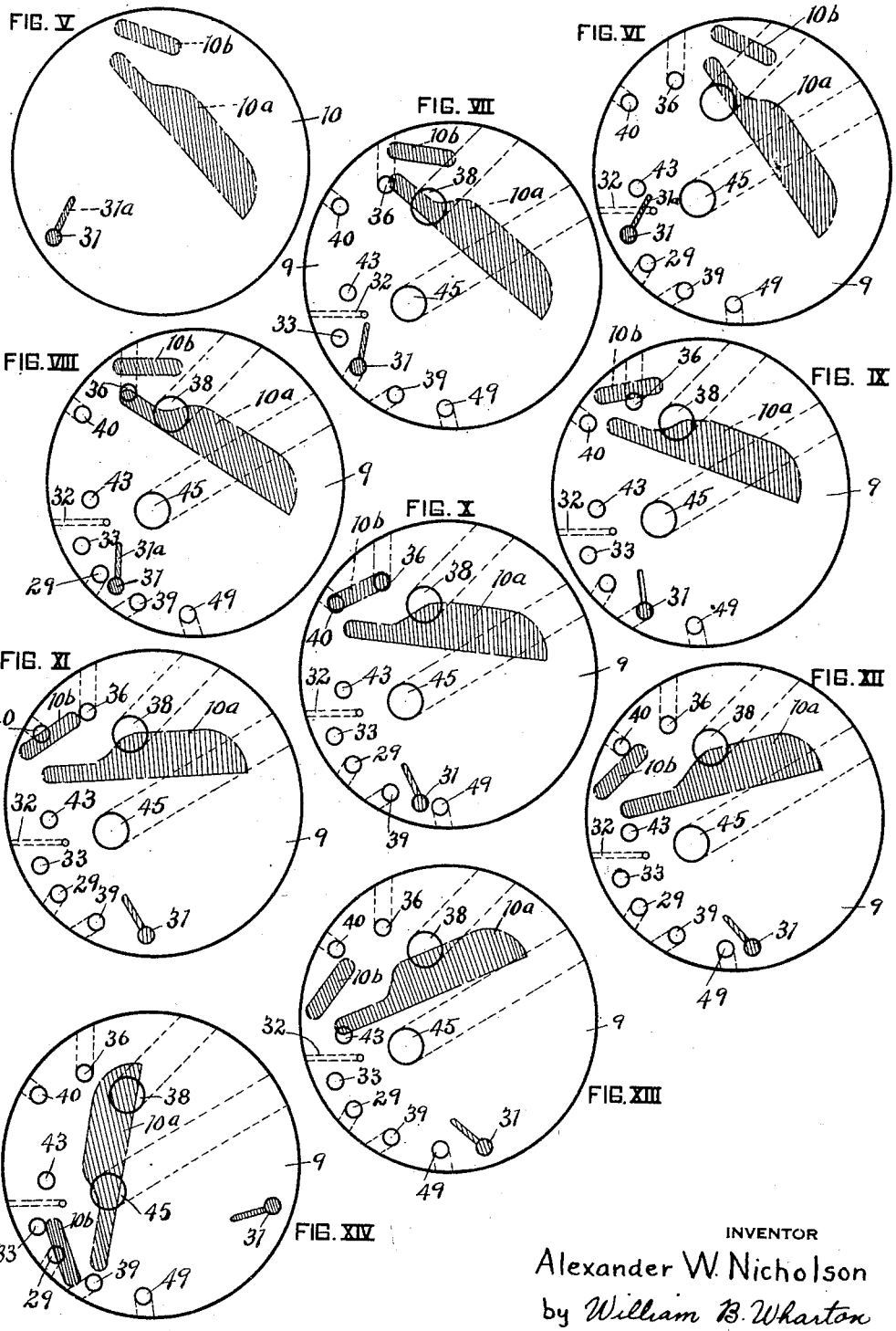

Patented Mar. 25, 1930

1,751,943

UNITED STATES PATENT OFFICE

ALEXANDER W. NICHOLSON, OF DICKERSON RUN, PENNSYLVANIA

ENGINEER'S BRAKE VALVE FOR AIR-BRAKE SYSTEMS

Application filed August 15, 1928. Serial No. 299,852.

This invention relates to an improvement in an engineer's valve for use in controlling the air brake system of a train.

The brake valve of the present invention is particularly adapted to be used in conjunction with the applicant's retaining valve which is illustrated and described in Patent No. 1,548,163, dated August 4, 1925. In order that the said retaining valve may function automatically it is necessary to provide means whereby two different and distinct pressures may be maintained in the brake or train line. That is, when the retaining valve is in its operative position the train line pressure should be relatively low, say 70 pounds, and when the retaining valve is not to function, the train line (running) pressure should be maintained at some higher pressure, say about 90 pounds.

In addition, the valve of this invention is designed to permit the brakes of the engine to be applied and held in application without braking the remainder of the train, and to permit the brakes of the train and engine to be applied together, and to permit the engine brakes to be released and the train brakes held in application, and to apply and to hold both the engine and train brakes while the pressure of the auxiliary reservoir is being restored for further use after an application of the brakes. These functions are to be controlled by the engineer's valve disclosed hereinafter, without the use of an independent and manually operated double-feed valve, and without the use of an independent brake valve.

It is further to be noted that the valve of this invention may be connected to the main train line in such a manner, that should two engines be employed as a double-header, that the engineer's brake valve of the second engine may be cut out in the usual manner, but still leave the said valve operable for an emergency application.

In the accompanying drawings Figure I is a side elevation of the brake valve of this invention; Figure II is a sectional view taken on the line II—II of Fig. I, the rotary valve portions being removed; Figure III is a central vertical sectional view taken on the line III—III of Fig. II; Figure IV is an enlarged sectional view taken on the line IV—IV of Fig. II; Figure V is a plan view of the rotary valve plate of the valve showing the cored-out ports in phantom by means of cross-hatching; and Figures VI to XIV inclusive show the rotary valve plate seat with its ports in full lines, and shows in phantom the cored-out ports of the rotary valve plate in its various operative positions, which will be described in detail hereinafter.

The reference numeral 1 denotes in general the assembled valve housing, which has operably arranged in the interior chamber 2 thereof the equalizing or application piston 3. This equalizing piston 3 is slidably mounted on the stem 4, and has the sleeve portions 3ª and 3ᵇ thereof machined to provide a valve seat engagement with conical portions of the stud 5 and stem base 4ª respectively. As illustrated, however, the portions 3ª and 3ᵇ cannot be seated concurrently, because the distance between the portions 5 and 4ª is greater than that between the machined conical seats of the members 3ª and 3ᵇ. A communication from above the piston 3 to below the same is normally had through the openings 3ᶜ, and through the clearance between the stem 4 and the wall of the bore 3ᵈ. The function and operation of equalizing or application pistons is generally known in the art, and therefore the operation of piston 3 will not be further described. The particular arrangement illustrated is of value, due to its simplicity of structure and sensitivity of action.

The train or brake line 6 is ported into the lower portion of chamber 2 beneath the application piston, and the pipe 7, which is connected to the usual equalizing chamber of present day air brake systems, is ported at 8 above the said piston. On the top of portion 1ª of the valve casing 1 there is machined the valve seat 9, in which the valve plate 10 is rotatably fitted. The member 11 has an engagement with the plate 10 by means of the pins 11ª, and is rotatably mounted in the upper casing portion 1ᵇ, as shown in Fig. III. Into the chamber 12 opens a port 13 which communicates directly from the main reservoir of the brake system through pipe 14. The pressure thus introduced from the main reservoir to the chamber 12 is relatively high, often ranging from 110 to 120 pounds per square inch, and serves to seat the rotary plate 10 with a corresponding force. However, to assist the said pressure in seating the said plate 10 there is a spring 15, the compression of which may be varied by means of the hand wheel 16 and the shaft 16ª having the threaded lower portion, as illustrated in Fig. III. The handle 17 is suitably fixed to the upper portion of the member 11 to permit manual rotation thereof, and of the valve plate 10.

With respect to the patented automatic retaining valve referred to supra, it should be said that its function is to retain the brakes in application after they have been applied, and in addition it operates the triple valve, (this triple valve is common in present air brake systems) to permit the auxiliary reservoir pressure to be built up and maintained during the time in which the brakes are retained in application. To accomplish this, it is necessary to provide means whereby the train line pressure may be maintained at either of two predetermined pressures. For example, it may be assumed that the retaining valve on a given car is adjusted, as set forth in the patent referred to above, to operate and retain the brakes in application when the train line pressure is below 72 pounds. Normally, the train line pressure is maintained at some higher pressure, assumed in this case to be 90 pounds. In a normal brake application, this train line pressure usually drops 20 pounds, and if it does not do so, the engineer can vent the train line through his valve until the pressure does drop 20 or more pounds. In this event the retaining valve operates to hold the brakes, as said above, because the train line pressure is below the 72 pound operating point at which the retaining valve is adjusted. In case the brakes are retained in application for a relatively long period of several minutes, such as is necessary on a long grade, the auxiliary reservoir pressure ordinarily "bleeds" away, or at best remains constant. If a further application of the brakes is made, the brake operating pressure of the auxiliary reservoir is again lowered. It is the practice of train engineers at the present time to apply the brakes for a short time, then release them and regain their auxiliary reservoir pressure, and then apply them again. This practice is fairly satisfactory in many cases, but on long steep grades this method of braking is dangerous, because the applications of the brakes must be in relative close sequence, and this results in successively decreasing the auxiliary reservoir pressure to a point where effectual braking is often impossible to obtain.

Since the retaining valve holds the brakes in application as long as the auxiliary reservoir pressure is below the set 72 pounds, and since pressures of from 50 to 70 pounds are effective braking pressures, the applicant conceived and provided means, which would permit the train line and auxiliary reservoir pressure to build up to a predetermined pressure (which is assumed in this case to be about 70 pounds) during the time in which the brakes are retained in application. The several advantages of this operation will be apparent to those skilled in the art, and for this reason they will not be related herein; suffice it to say, however, that there will always be an effective brake operating pressure in the auxiliary reservoir.

As said supra, the normal or running pressure in the train line and auxiliary reservoirs is maintained constant at a pressure appreciably lower than that of the main reservoir. Means for controlling this pressure comprise a high pressure feed valve 18.

This feed valve is described in my copending application, Serial No. 299,699, filed August 15, 1928. To give a general knowledge of its operation, a vertical sectional view thereof is given in Fig. IV. The main reservoir pressure enters from the chamber 12 through the port 29 of the rotary valve seat 9 to orifice 19 above the valve member 20. Obviously, this is only true when the rotary valve plate 10 is placed into position to permit communication between the chamber 12 and the port 29. In the chamber 21 is the piston 22, above which the exit port 23 opens. The port 23 communicates, by means of passage 30, directly from above piston 22 to the chamber 2 above the application piston 3. The spring 24 is adjusted by means of the threaded sleeve 28 to remain in its illustrated position as long as the desired pressure of 90 pounds prevails in the chamber 21. When, however, this pressure drops below this value, the said spring urges the piston upwardly against the rod 25, which unseats the valve 26 and valve 20 to allow the main reservoir pressure to enter the chamber 21 through the passages 27. This automatically restores, and due to the sensitivity of the device, maintains the pressure in chamber 21 at the desired pressure of 90 pounds.

Similarly, there is a low pressure or auxiliary feed-valve 48, which has an entrance thereto ported at 49 in the valve seat 9. The internal structure of the latter feed valve is practically the same as that of the high pressure feed valve 18. The low pressure feed valve 48, however, has its controlling springs adjusted to permit air to feed through the passage 51 to the chamber 2 above the application piston 3 at a pressure of 70 pounds. It is this 70 pound pressure feed-valve that recharges the auxiliary reservoir, through the triple valve and train line, while the retaining valves of the cars are functioning to hold the brakes in application; it taking, as said previously, 72 pounds or more pressure in the train line to release the retaining valve.

In order that the operation of the engineer's valve, and the air brake system as a whole, may be clearly understood, the various operating positions of the handle 17 will be described in the order of their location from left to right.

*First position.*—This position is known as the "full release," and is shown diagrammatically in Fig. VI. As illustrated in Fig. V, the rotary valve plate 10 is provided with two cored-out portions 10a and 10b. There is also a port 31 which extends through the plate 10 and member 11 to permit a direct communication between the chamber 12 and the valve seat 9. The shallow slot 31a is machined on the under surface of the plate 10, and serves to permit air from the chamber 12 to escape into the small warning port 32, and blow out at the side of the engineer's brake valve 1 to warn the engineer when the brake handle is being moved into full release.

In the full release position the air passes directly from chamber 12, at main reservoir pressure, through the port 31 which in this position overlies the opening 33 that vents to the equalizing chamber 2 above the piston 3. The function of this position is to permit a large head of air to flow into the train line and release the brakes, and it may readily be understood that if this position is maintained for any appreciable time that the auxiliary reservoir would be charged to the pressure of the main reservoir, which would cause severe brake sticking after an application of the brakes. It is for this reason that the warning port is provided to attract the attention of the engineer. All other ports than those mentioned, it will be noted, are blanked in the full release position.

*Second position.*—By moving the handle 17 one point to the right, the "high running" or "high train line" position is entered. The port arrangement in this position is shown in Fig. VII, wherein the port 31 overlies the opening 29, and feeds the main reservoir pressure from chamber 12 to the high pressure feed valve 18, which allows the air to flow therefrom, through the passage 30 into chamber 2 above the application piston 3. This charges the train line and auxiliary reservoirs to a pressure of 90 pounds. It may be well to note that the high pressure governor pipe 34 is connected by a passage 35 to the high pressure feed-valve port 29.

In the high running position the cored-out portion 10a slightly overlies the port 36, which opens from the driver brake application pipe 37, and vents the same to the exhaust opening 38. This releases the driver brakes for the normal running of the train.

*Third position.*—Figure VIII illustrates the third or "driver brake release" position. In this position all ports are blanked except the driver brake application pipe, which is vented by recess 10a to the exhaust 38. It is possible, due to this particular feature of the valve structure, to apply the brakes of the engine and train, as explained infra, and then move the valve handle into the third position to release the driver brakes, and since in this position all except the driver application port 36 are blanked, the remainder of the train brakes may be held in application.

*Fourth position.*—This position is illustrated in Fig. IX, and is known as the "holding position." The port 31 registers with the passage opening 39, which is an auxiliary opening in the seat 9 to the feeding passage of the high pressure feed valve 18. All other ports are blanked. The only difference between running position and holding position is that in the latter position the driver brakes are not released after an application, while the remaining brakes of the train are released. Therefore, this permits the drivers to be braked, while the train brakes may be released and the brake line recharged.

*Fifth position.*—This position is shown in Fig. X, wherein the recess 10b connects the driver brake application port 36 with the port 40 leading from the driver brake supply pipe 41. In this position the driver brakes may be applied without braking the rest of the train, and this structure, in conjunction with several other of the described features, dispenses with the necessity of an independent engineer's valve.

*Sixth position.*—The port arrangement in this "low brake" position is illustrated in Fig. XI. After an application of the brakes, as will be described in the eighth position, the handle 17 is moved into this position, which causes the port 31 to register with the entering port 49 of the low or 70 pound pressure feed valve 48. This permits the main reservoir pressure to feed from the chamber 12, and go into the feed valve 48, which feeds the air into the train line at a pressure of 70 pounds. As explained in the early part of the specification, this restores the train line and auxiliary reservoirs to 70 pounds without taking the brakes out of the applied position in which they are maintained by the retaining valves.

*Seventh position.*—The "lap" position is shown in Fig. XII, and as indicated, all of the ports are entirely blanked. The utility of the lap position is well known, and therefore, it will not be further described.

*Eighth position.*—This is the "service" position, and by means of the recess 10a there is permitted a gradual opening of the port 43 to the exhaust port 38, as shown in Fig. XIII. Port 43 opens into the chamber 2 above the equalizing piston 3, and the consequent reduction of pressure above this piston causes it to move upwardly until the seat $3^a$ closes on the stud 5. This movement unseats the conical machined portion $3^b$ from the portion $4^a$, and permits a reduction of the pressure of the train line 6 through the passages $4^b$ and $4^c$ to the atmosphere, as may be understood from Fig. III. The gradual reduction of the train line applies the brakes slowly, and the handle may be left in this position until the desired braking effect is reached. Ordinarily, an engineer places the handle in lap after he reaches this desired reduction, but in the applicant's device, the handle is moved to retaining valve or sixth position, which allows the train line and auxiliary reservoirs to build up to 70 pounds pressure, as described supra. The application piston 3 returns to its normal position, illustrated in Fig. III, as soon as the handle 17 is removed from service position into the retaining position.

*Ninth position.*—This is the "emergency" position, which communicates the emergency pipe 44, through the port 45, directly to the exhaust port 38, and gives the desired quick application of the brakes. It may be well to explain that the emergency pipe is simply an auxiliary connection to the train line, and permits the same to be directly connected to an exhaust port without the air passing through the application chamber 2. The emergency pipe is connected to the train line below the usual cut-out valve, and as a result, an emergency application of the brakes may be had if this cut-out valve works shut, or if it is closed intentionally, as is customary in the second engine of a double header, an emergency application may still be had.

What I claim is:

1. In an air brake system equipped with retaining valves, an engineer's brake valve, said brake valve having ports and passages, certain of said ports and passages communicating with a high pressure supply, certain of said ports and passages communicating with a low pressure supply, certain of said ports and passages communicating with the train line, and certain ports and passages opening to the atmosphere, and valving means in said brake valve being movable to communicate the high pressure supply with the train line and arranged to communicate the train line with the exhaust ports and passages to operate the brakes and retaining valves, said valving means being also movable to communicate the ports and passages from the train line to the low pressure supply, said low pressure supply providing a pressure to the train line insufficient to operate the retaining valves.

2. In an air brake system equipped with retaining valves and triple valves, an engineer's brake valve, said brake valve having ports and passages, certain of said ports and passages communicating with a high pressure supply, certain of said ports and passages communicating with a low pressure supply, certain of said ports and passages opening to the atmosphere, and valving means in said brake valve being movable to communicate the high pressure supply with the train line and arranged to communicate the train line with the exhaust ports and passages to operate the brakes and retaining valves, said valving means being also movable to communicate the ports and passages from the train line to the low pressure supply, said low pressure supply providing a pressure to the train line insufficient to operate the retaining valves and triple valves.

3. In an air brake system equipped with retaining valves and triple valves, an engineer's brake valve, said brake valve having ports and passages, certain of said ports and passages communicating with a high pressure supply, certain of said ports and passages communicating with a low pressure supply, certain of said ports and passages opening to the atmosphere, and valving means in said brake valve being movable to communicate the high pressure supply with the train line and arranged to communicate the train line with the exhaust ports and passages to operate the brakes and retaining valves, said valving means being also movable to communicate the port and passages from the train line to the low pressure supply, said low pressure supply providing a pressure to the train line and auxiliary reservoirs of the system without operating the retaining valves and triple valves.

4. In an air brake system equipped with retaining valves and triple valves, an engineer's brake valve, said brake valve having ports and passages, certain of said ports and passages communicating with a high pressure supply, certain of said ports and passages communicating with a low pressure supply, certain of said ports and passages opening to the atmosphere, and valving means in said brake valve being movable to communicate the high pressure supply with the train line and arranged to communicate the train line with the exhaust ports and passages to operate the brakes and retaining valves, said valving means being also movable to communicate the ports and passages from the train line to the low pressure supply, said low pressure supply maintaining a pressure in the train line and auxiliary reservoirs sufficient for a service application of the brakes and insufficient to release the brakes and retaining valves, said valving means being further movable to connect the train line to the atmosphere without releasing the brakes or retaining valves.

5. In an air brake system equipped with retaining valves and triple valves, an engineer's brake valve, said brake valve having ports and passages, certain of said ports and passages communicating with a high pressure supply, certain of said ports and passages communicating with a low pressure supply, certain of said ports and passages opening to the atmosphere, and valving means in said brake valve being movable to communicate the high pressure supply with the train line and arranged to communicate the train line with the exhaust ports and passages to operate the brakes and retaining valves, said valving means being further movable after a brake application to communicate the ports and passages from the train line to the low pressure supply, said low pressure supply operating the triple valve and increasing the operating pressure in the train line and auxiliary reservoirs without releasing the brakes and retaining valves.

6. In an air brake system equipped with retaining valves and triple valves, an engineer's brake valve, said brake valve having ports and passages, certain of said ports and passages communicating with a high pressure supply, certain of said ports and passages communicating with a low pressure supply, certain of said ports and passages opening to the atmosphere, and valving means in said brake valve being movable to communicate the high pressure supply with the train line and arranged to communicate the train line with the exhaust ports and passages to operate the brakes and retaining valves, said valving means being further movable after a brake application to communicate the ports and passages from the train line to the low pressure supply, said low pressure supply operating the triple valve and increasing the operating pressure in the train line and auxiliary reservoirs without releasing the brakes and retaining valves, said valving means being still further movable to register certain of said ports and passages to communicate the train line to the atmosphere to give an increased application of the brakes without releasing the same from their retained position.

7. In an air brake system equipped with retaining valves, and triple valves, an engineer's brake valve, said brake valve having ports and passages to an auxiliary pressure feeding device, said valve having ports and passages to the train line, and valving means being movable to connect the ports and passages from the auxiliary pressure feeding means to the passages to the train line, the pressure fed by said means being sufficient for a service application of the brakes and insufficient to operate the retaining valves.

8. An air brake system equipped with retaining valves and triple valves, an engineer's brake valve, said brake valve having ports and passages to an auxiliary pressure feeding device, said brake valve having ports and passages to the train line, valving means to connect the passages from the pressure feeding device with the ports and passages leading to the train line, said pressure feeding device being arranged to increase the pressure in the train line and to operate the triple valve to increase the pressure in the auxiliary reservoirs without releasing the retaining valves and brakes.

9. In an air brake system equipped with automatic retaining valves and triple valves, an engineer's brake valve, said brake valve having ports and passages, certain of said ports and passages communicating with the train line, certain of said ports and passages communicating with a normal pressure feeding device, certain of said ports and passages communicating with a relatively low pressure feeding devise, and valving means arranged to operatively interconnect the high pressure feeding device to the train line to maintain the latter at a normal brake operating pressure, said valving means being also movable to interconnect the ports and passages from the low pressure feeding device to the train line, the low pressure fed by the latter feeding device being sufficient to permit a service application of the brakes and sufficient to move the triple valves to permit the low pressure to be maintained in the auxiliary reservoirs, and said low pressure being insufficient to operate the retaining valves to release the brakes.

10. In a train air brake system equipped with automatic retaining valves, an engineer's brake valve, said brake valve having ports from a pressure supply and ports to the atmosphere, rotary means for connecting said ports to apply the brakes and retaining valves of the engine and cars of the train, said brake valve also having ports from a pressure supply and ports to the engine brake line, said rotary means being arranged to connect the latter of said ports to release the engine brakes without releasing the brakes of the remainder of the train.

11. In a train air brake system equipped with automatic retaining valves, an engineer's brake valve, said brake valve having ports and passages from the train line, said valves having ports and passages to the atmosphere, said valve having ports and passages from a pressure supply, said valve having ports and passages to the operating means of the engine brakes, valving means being movable to connect the train line to the atmosphere to apply all the brakes and retaining valves of the train, said valving means being also movable to connect the passages to the engine brake operating means with the atmosphere or the pressure supply to operate the engine brakes independently of the rest of the train.

12. In an engineer's brake valve comprising an equalizing chamber having an equalizing piston operative therein, a passage from an equalizing tank opening above said piston, a passage opening below said piston to the brake line, a rotary valve seated in a chamber communicating with a pressure supply, a high pressure feed valve, said feed valve having an inlet ported to the rotary valve seat and an outlet port opening in the equalizing chamber above the equalizing piston, and a passage from above said piston to the region below said piston, said rotary valve being operative to connect the feed valve inlet port to the pressure supply.

13. An engineer's brake valve comprising an equalizing chamber having an equalizing piston operative therein, a passage from an equalizing tank opening above said piston, a passage opening below said piston to the brake line, a high pressure feed valve, said feed valve having an inlet ported to a rotary valve seat and an outlet port opening in the equalizing chamber above the equalizing piston, a relatively low pressure feed valve, said latter feed valve having an inlet ported to the rotary valve seat and an outlet port opening in the equalizing chamber above the piston, a passage normally opening from above said piston to below the same, and said rotary valve being operative to connect either feed valve inlet port to the pressure supply.

14. In an engineer's brake valve an equalizing chamber having an equalizing piston therein, a sleeve portion integral with said piston, said sleeve having a central bore and being mounted on a fixed stem, said stem being smaller than the bore of the sleeve, and at least one opening from said bore beneath the piston.

15. In an engineer's brake valve an equalizing chamber having an equalizing piston therein, a sleeve portion integral with said piston, said sleeve having a central bore and being mounted on a fixed stem, said stem being smaller than the bore of the sleeve, a ported valve seat formed at the base of said stem, the lower portion of said bore being machined to seat on said valve seat, a tapered stud fixed adjacent the upper end of said stem, the upper end of said bore being machined to seat on the tapered stud when the piston rises, and at least one port in the sleeve below the piston opening from said bore.

In witness whereof, I hereunto set my hand.

ALEXANDER W. NICHOLSON.